United States Patent
Kunihiro (10) Patent No.: US 9,902,070 B2
(45) Date of Patent: Feb. 27, 2018

(54) ROBOT SYSTEM AND ROBOT CONTROL METHOD FOR ADJUSTING POSITION OF COOLANT NOZZLE

(71) Applicant: FANUC Corporation, Yamanashi (JP)

(72) Inventor: Keisuke Kunihiro, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 95 days.

(21) Appl. No.: 15/043,621

(22) Filed: Feb. 15, 2016

(65) Prior Publication Data

US 2016/0236351 A1    Aug. 18, 2016

(30) Foreign Application Priority Data

Feb. 16, 2015    (JP) .................................. 2015-028043

(51) Int. Cl.
*B23Q 17/24* (2006.01)
*B23Q 11/10* (2006.01)
*B25J 9/16* (2006.01)

(52) U.S. Cl.
CPC .......... *B25J 9/1697* (2013.01); *B23Q 17/249* (2013.01); *B23Q 11/1076* (2013.01); *G05B 2219/50248* (2013.01); *Y10S 901/09* (2013.01); *Y10S 901/47* (2013.01)

(58) Field of Classification Search
CPC .... B25J 9/1697; B23Q 11/10; B23Q 11/1076; G05B 2219/50248; Y10S 901/09; Y10S 901/47
See application file for complete search history.

(56) References Cited

U.S. PATENT DOCUMENTS

| | | | | |
|---|---|---|---|---|
| 6,163,946 A | * | 12/2000 | Pryor | A01B 69/008 |
| | | | | 29/407.04 |
| 2011/0208347 A1 | * | 8/2011 | Otake | B25J 9/0093 |
| | | | | 700/174 |
| 2012/0296469 A1 | * | 11/2012 | Yoshinaga | B25J 15/0616 |
| | | | | 700/218 |
| 2012/0308323 A1 | | 12/2012 | Gardner et al. | |

FOREIGN PATENT DOCUMENTS

| | | |
|---|---|---|
| JP | 62-106503 A | 5/1987 |
| JP | 1-188289 A | 7/1989 |
| JP | 4-98545 U | 8/1992 |
| JP | 5-41655 U | 6/1993 |
| JP | 7-299694 A | 11/1995 |
| JP | 10-118884 A | 5/1998 |
| JP | 2001-212735 A | 8/2001 |
| JP | 2002-18674 A | 1/2002 |
| JP | 2012-35391 A | 2/2012 |
| JP | 2014-108496 A | 6/2014 |

* cited by examiner

*Primary Examiner* — Abby Y Lin
(74) *Attorney, Agent, or Firm* — Hauptman Ham, LLP (57) ABSTRACT

A robot system which can adjust the position of a coolant nozzle at a lower cost, that is, a robot system which comprises a robot, a robot controller which controls the operation of the robot, and a notification part which notifies the type of the workpiece which is processed by the machine tool to the robot controller. The robot controller determines the target position of the coolant nozzle with respect to the workpiece to be processed based on the type of the workpiece which is obtained from the notification part and makes the coolant nozzle move by the robot so as to place the coolant nozzle at the target position.

10 Claims, 12 Drawing Sheets

ROBOT SYSTEM AND ROBOT CONTROL METHOD FOR ADJUSTING POSITION OF COOLANT NOZZLE

RELATED APPLICATIONS

The present application claims priority to Japanese Application Number 2015-028043, filed Feb. 16, 2015, the disclosure of which is hereby incorporated by reference herein in its entirety.

BACKGROUND OF THE INVENTION

1. Field of the Invention

The invention relates to a robot system and robot control method for adjusting the position of a coolant nozzle.

2. Description of the Related Art

Known in the art is a device which can adjust the position of a coolant nozzle of a machine tool (for example, Japanese Patent Publication No. 2002-18674A and Japanese Utility Model Publication No. 5-41655U).

According to the above-mentioned related art, a drive device which is comprised of a motor, cylinder, etc. is separately provided for making the coolant nozzle move. According to such a configuration, the device becomes complicated. This ends up leading to an increase of the cost.

SUMMARY OF INVENTION

In an aspect of the invention, a robot system for adjusting a position of a coolant nozzle provided at a machine tool, comprises a robot, a robot controller which controls the operation of the robot, and a notification part which notifies the robot controller of the type of the workpiece to be processed by the machine tool.

The robot controller determines the target position of the coolant nozzle with respect to the workpiece when processing, based on the type of the workpiece acquired from the notification part, and moves the coolant nozzle by the robot so as to arrange the coolant nozzle at the target position.

The robot controller may calculate the difference between the target position and the current position of the coolant nozzle, and move the coolant nozzle by the robot so that the calculated difference becomes smaller.

The robot system may further comprise an imaging part. The robot controller may identify the current position of the coolant nozzle based on the image of the coolant nozzle imaged by the imaging part, and calculate the above difference.

The notification part may identify the type of the workpiece based on the image of the coolant nozzle imaged by the imaging part, and notify the robot controller of it. The imaging part may be mounted at the robot arm of the robot.

The robot system may further comprise a storage which stores in advance the target position in association with the type of the workpiece. The robot controller may read out from the storage the target position corresponding to the type of the workpiece acquired from the notification part. The notification part may be built in an external device or a host controller which is connected to the robot controller.

In another aspect of the invention, a robot control method for adjusting a position of a coolant nozzle provided at a machine tool by means of a robot, comprises a step of acquiring the type of the workpiece to be processed by the machine tool.

Further, the method comprises the steps of determining a target position of the coolant nozzle with respect to the workpiece set at the machine tool, based on the acquired type of the workpiece; and moving the coolant nozzle by the robot so as to arrange the coolant nozzle at the target position.

DETAILED DESCRIPTION

Below, embodiments of the invention will be explained in detail based on the drawings. First, referring to FIG. 1 and FIG. 2, a robot system 10 according to an embodiment of the invention will be explained. Note that, in the following explanation, the directions are defined so as to show the Cartesian coordinate system in the figures. For convenience of explanation, the x-axis plus direction is referred as the left direction (or leftward), the y-axis plus direction (i.e., the direction toward back side of FIG. 1) is referred as the front direction (or frontward), and the z-axis plus direction is referred as the upper direction (or upward).

Figure 1:
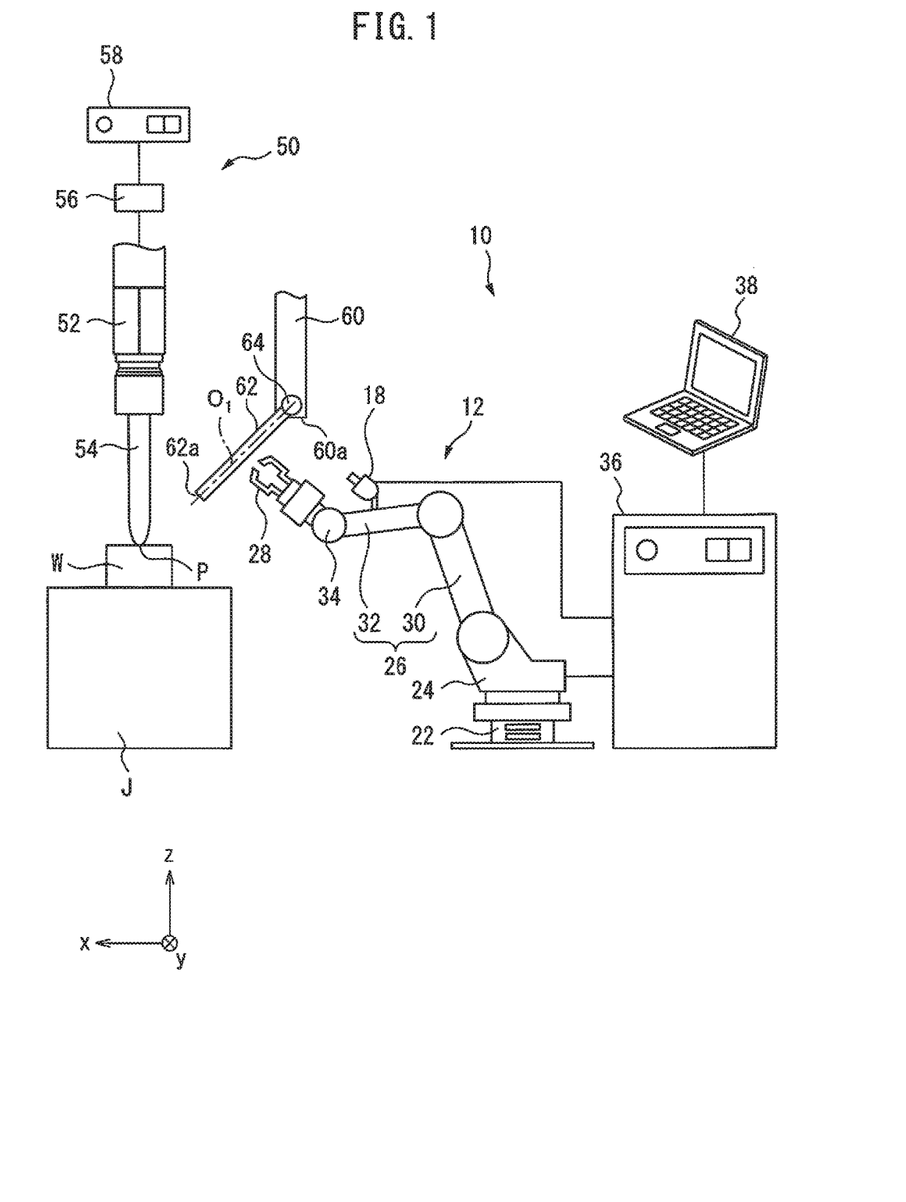
FIG. 1 is a schematic view of a machine tool and robot system according to an embodiment of the invention.
Figure 2:
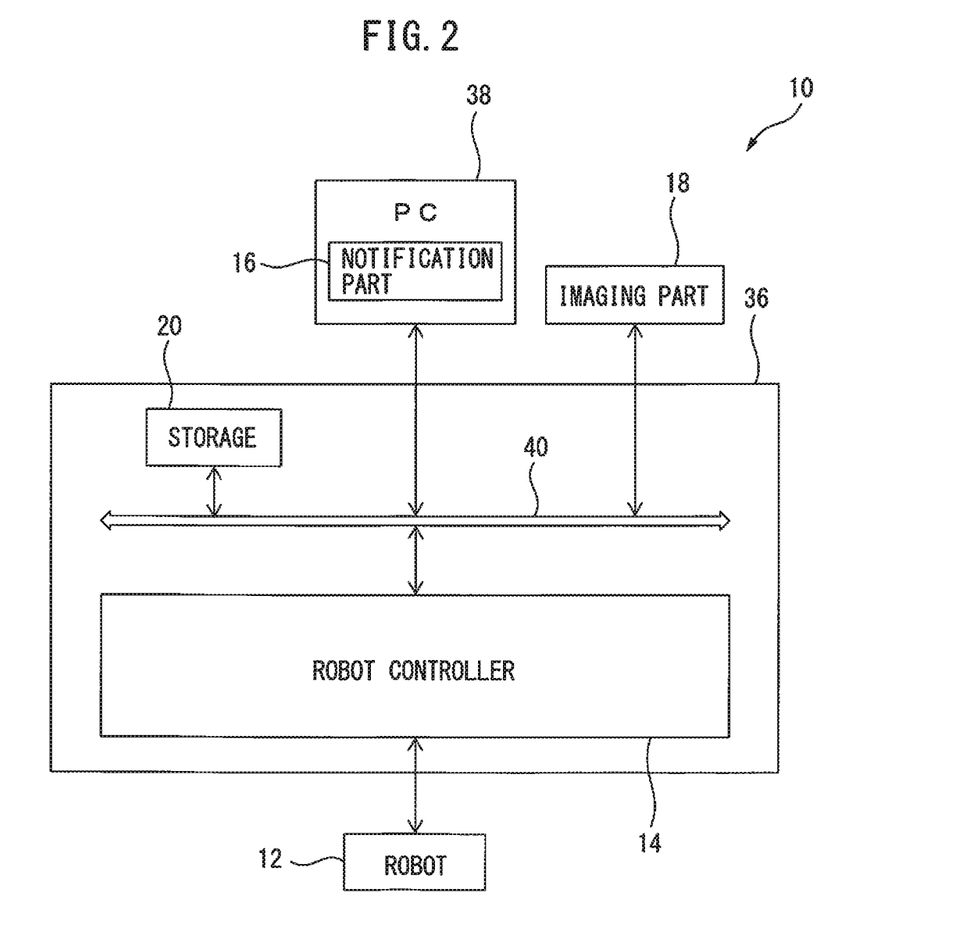
FIG. 2 is a block diagram of the robot system shown in FIG. 1.

The robot system 10 includes a robot 12, a robot controller 14, a notification part 16, an imaging part 18, and a storage 20. The robot 12 is e.g. a vertical multi-articulated robot, and includes a robot base 22, a swivel drum 24, a robot arm 26, and a robot hand 28. The robot base 22 is fixed to a floor of a work cell. The swivel drum 24 is attached to the robot base 22 so as to be able to swivel about the vertical axis.

The robot arm 26 includes a lower arm 30 rotatably attached to the swivel drum 24, and a forearm 32 rotatably attached to the distal end of the lower arm 30. The robot hand 28 is attached to the distal end of the forearm 32 via a wrist 34. The robot hand 28 can grip and release an object.

In this embodiment, the robot controller 14 and storage 20 are built in the robot control device 36. The robot controller 14 sends commands to servo motors (not shown) built in the robot 12 so as to control the operation of the robot 12.

The storage 20 is comprised of e.g. an electrically erasable and programmable nonvolatile memory such as EEPROM®, or a random access memory capable of being read out or written on at a high speed such as DRAM or SRAM.

The imaging part 18 is mounted at the robot arm 26. The imaging part 18 includes an imaging element comprised of e.g. a CCD or CMOS sensor. The imaging part 18 converts an image of an object which passes through a lens into an electrical signal, and outputs it as image data.

The imaging part 18 images a coolant nozzle 62 and workpiece W explained below in accordance with a command from the robot controller 14, and transmits the image data to the robot controller 14.

In this embodiment, a PC (personal computer) 38 as an external device installed outside of the robot control device 36 performs the function of the notification part 16. Note that, the function of the notification part 16 will be explained later.

The robot controller 14 is communicatively connected to the imaging part 18, storage 20, and PC 38 via a bus 40.

Next, the machine tool 50 will be explained. The machine tool 50 processes the workpiece W set on the jig J. The machine tool 50 includes a spindle 52, a tool 54, a spindle drive part 56, a machine tool controller 58, and coolant nozzle 62. The spindle 52 extends in the vertical direction, and holds the tool 54 at its bottom end.

The machine tool controller 58 directly or indirectly controls each component of the machine tool 50. The machine tool controller 58 is communicatively connected to the robot controller 14. The robot controller 14 and machine tool controller 58 communicate with each other so as to execute the process on the workpiece W.

The spindle drive part 56 includes e.g. a servo motor, and moves the spindle 52 in the vertical direction in accordance with a command from the machine tool controller 58. Further, the spindle drive part 56 rotates the spindle 52 about the vertical axis in accordance with a command from the machine tool controller 58.

The coolant nozzle 62 is attached to a spindle head (not shown) of the machine tool 50 via an attachment 60. The spindle head is fastened to the work cell, and holds the spindle 52 so as to be movable in the vertical direction.

In this embodiment, the coolant nozzle 62 is a hollow tubular member extending along the axis $O_1$, and is rotatably attached to the front end 60a of the attachment 60 via a rotary shaft 64.

The rotary shaft 64 extends in the front-rear direction, and the coolant nozzle 62 can rotate about the rotary shaft 64. The coolant nozzle 62 is connected to a coolant supply device (not shown) installed outside of the machine tool 50. The coolant supplied from the coolant supply device passes through the inside of the coolant nozzle 62, and is discharged from the discharge port 62a provided at the front end of the coolant nozzle 62.

Next, the operation of the machine tool 50 will be explained. When processing the workpiece W, the machine tool controller 58 sends a command to the spindle drive part 56 so as to downwardly move the spindle 52 toward the workpiece W. As a result, the front end of the tool 54 contacts the upper surface of the workpiece W at the processing point P.

When processing the workpiece W, it is necessary to supply the coolant to the processing point P. Therefore, the coolant nozzle 62 must be suitably positioned with respect to the workpiece W so that the coolant discharged from the coolant nozzle 62 impinges on the processing point P when processing the workpiece W.

In this embodiment, the robot system 10 adjusts the position of the coolant nozzle 62 by means of the robot 12, in order to appropriately position the coolant nozzle 62 with respect to the workpiece W.

Figure 3:
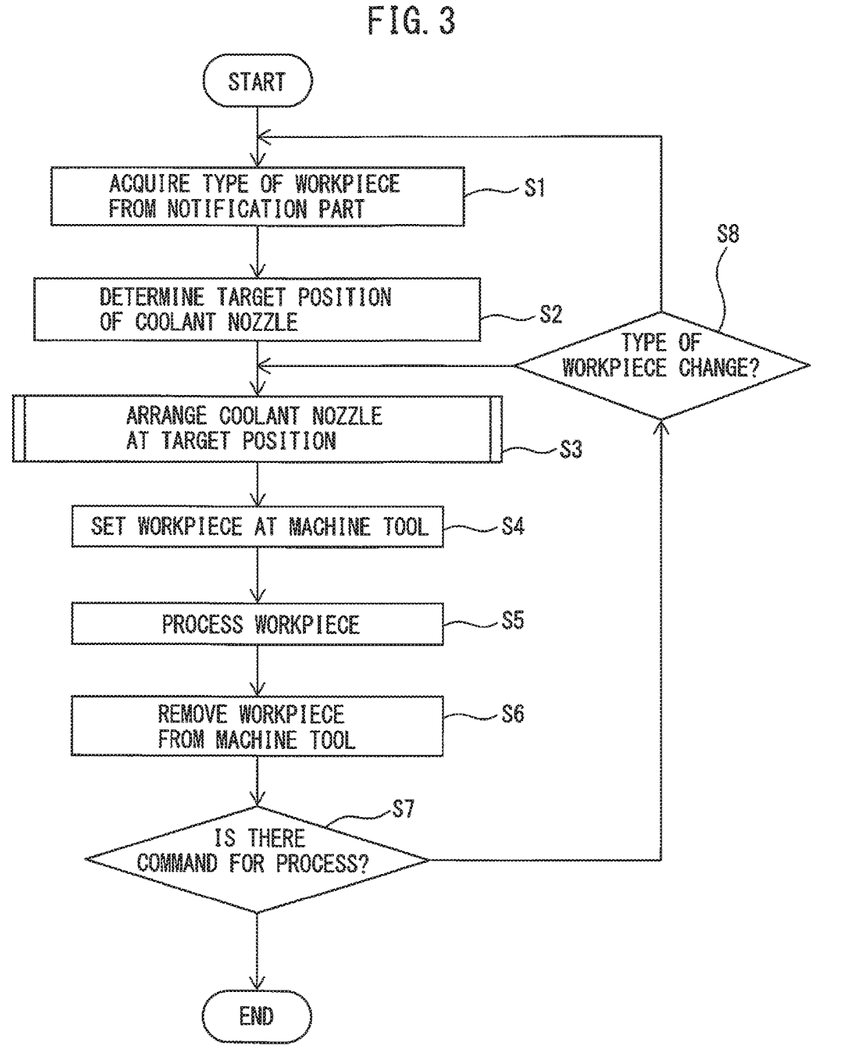
FIG. 3 is a flow chart showing a flow of processing a workpiece, according to an embodiment of the invention.

Below, referring to FIG. 1 to FIG. 6, the operation of the robot system 10 will be explained. FIG. 3 shows an example of the flow of processing the workpiece W. The operation flow shown in FIG. 3 starts when the robot controller 14 and machine tool controller 58 receive a command for process on the workpiece W from a user or a host controller.

At step S1, the robot controller 14 acquires the type of the workpiece W from the notification part 16. For example, the type of the workpiece W is pre-set by the user in accordance with the dimension or shape of the workpiece before processing. As an example, the types of workpiece W are classified as in the table shown below, in accordance with the dimension and shape of the workpiece W before processing.

TABLE 1

| Type of workpiece | Type A | Type B | Type C |
|---|---|---|---|
| Shape | Columnar shape | Square-columnar shape | Rectangular plate shape |
| Height in vertical direction | 50 mm | 80 mm | 2 mm |

The user operates the PC 38 to input the type of the workpiece W to be processed. The PC 38 functions as the notification part 16 so as to notify the robot controller 15 of information relating to the type of the workpiece W designated by the user.

At step S2, the robot controller 14 determines the target position of the coolant nozzle 62 with respect to the workpiece W, based on the type of the workpiece W received from the PC 38. The target position corresponds to a position of the coolant nozzle 62 with respect to the workpiece W in which the coolant discharged from the coolant nozzle 62 can impinge on the processing point P.

Figure 5:
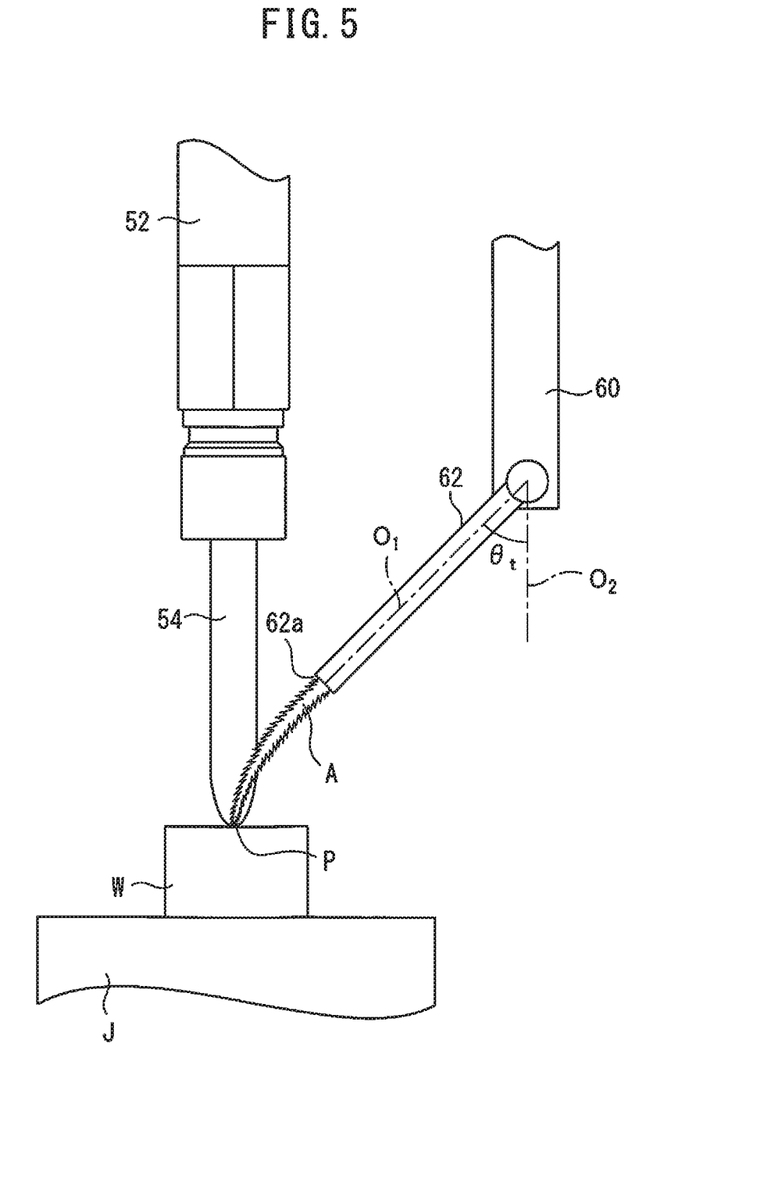
FIG. 5 is a view showing that the coolant nozzle shown in FIG. 1 is arranged at a target position, and discharges a coolant therefrom.

The state where the coolant nozzle 62 is arranged at the target position is shown in FIG. 5. In this state, the coolant nozzle 62 is arranged so as to be inclined with respect to the virtual axis $O_2$ extending in the vertical direction by an angle $\theta_t$, so that the coolant A is discharged from the coolant nozzle 62 so as to impinge on the processing point P.

The injection path of the coolant A discharged from the coolant nozzle 62 depends on the flow rate of the discharged coolant (i.e., the supply pressure of the coolant by the coolant supply device), and on the inclined angle θ of the coolant nozzle 62 with respect to the virtual axis $O_2$.

Therefore, by experimentally obtaining in advance the relationship among the flow rate of the coolant, the inclined angle θ, and the injection path of the coolant in these conditions, it is possible to feed the coolant from the coolant nozzle 62 to the desired position.

For example, if the type of the workpiece W is set by the user as shown in the following Table 1, since the types A to C have respectively different heights in the vertical direction, the coordinates of the processing point P are different among the types A to C.

Therefore, the target positions of the coolant nozzle 62, i.e., the angles $\theta_t$, for the types A to C are different. In this embodiment, the storage 20 pre-stores the relationship between the type of the workpiece W and the angle $\theta_t$. For example, the storage 20 pre-stores a data table shown below.

TABLE 2

| Type of workpiece | Type A | Type B | Type C |
|---|---|---|---|
| Angle $\theta_t$ | 45° | 48° | 10° |

The robot controller 14 reads out from the storage 20 the angle $\theta_t$ corresponding to the type of the workpiece W received from the PC 38, and determines the position of the coolant nozzle 62 corresponding to the read-out angle $\theta_t$ as the target position of the coolant nozzle 62.

At step S3, the robot controller 14 arranges the coolant nozzle 62 at the target position determined at step S2. This step S3 will be explained with reference to FIG. 4.

Figure 4:
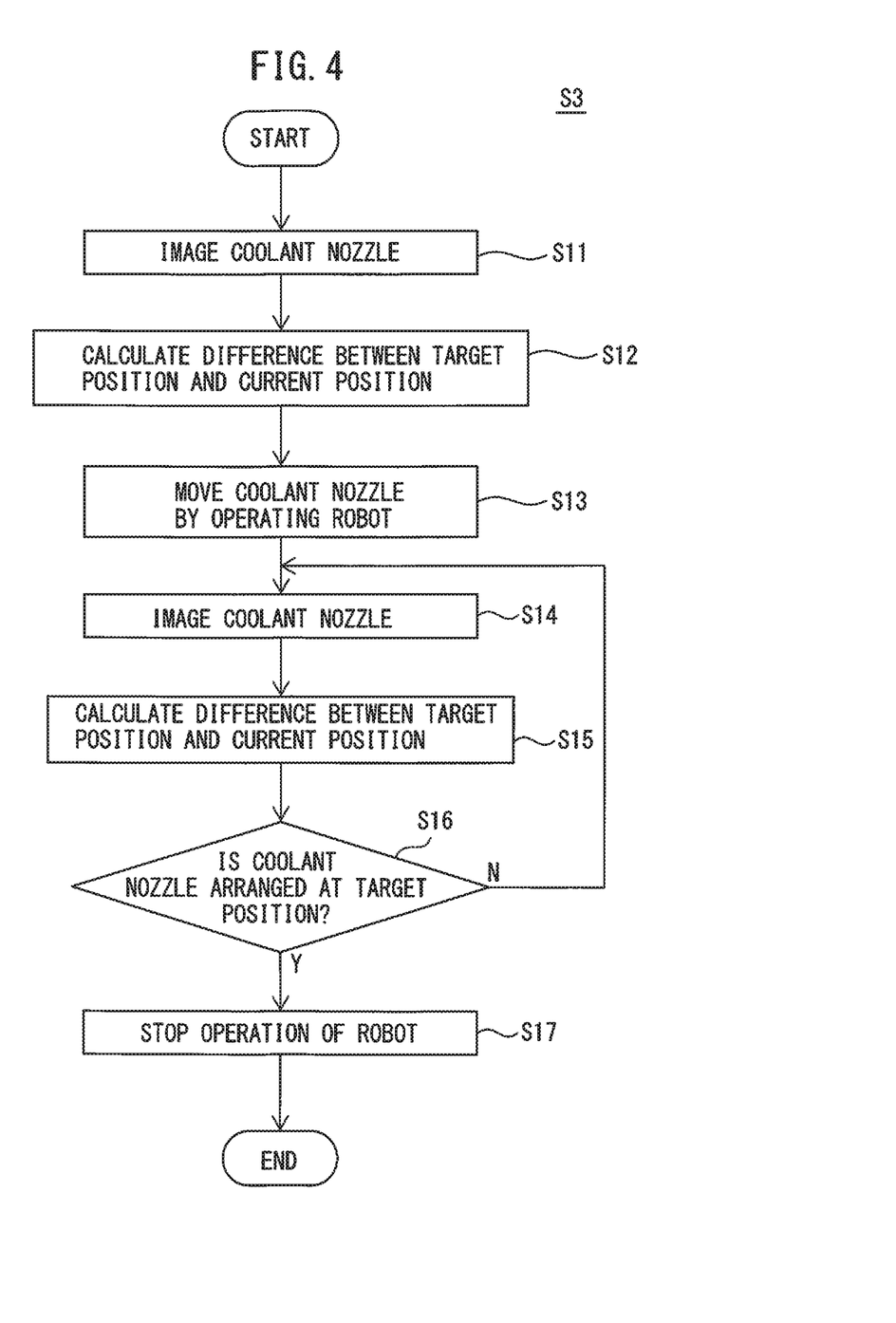
FIG. 4 is a flow chart of step S3 in FIG. 3.

After starting step S3, at step S11, the robot controller 14 images the coolant nozzle 62. Specifically, the robot controller 14 operates the robot 12 so as to move the imaging part 18 to rear side of the coolant nozzle 62.

Then, the robot controller 14 sends a command to the imaging part 18 so as to image the coolant nozzle 62 from rear side. The imaging part 18 sends the image data of the coolant nozzle 62 to the robot controller 14.

At step S12, the robot controller 14 calculates the difference between the target position determined at step S2 and the current position of the coolant nozzle 62. For example, assuming that the coolant nozzle 62 is arranged at the current position indicated by the solid line $P_0$ in FIG. 6 at the end of step S11.

Figure 6:
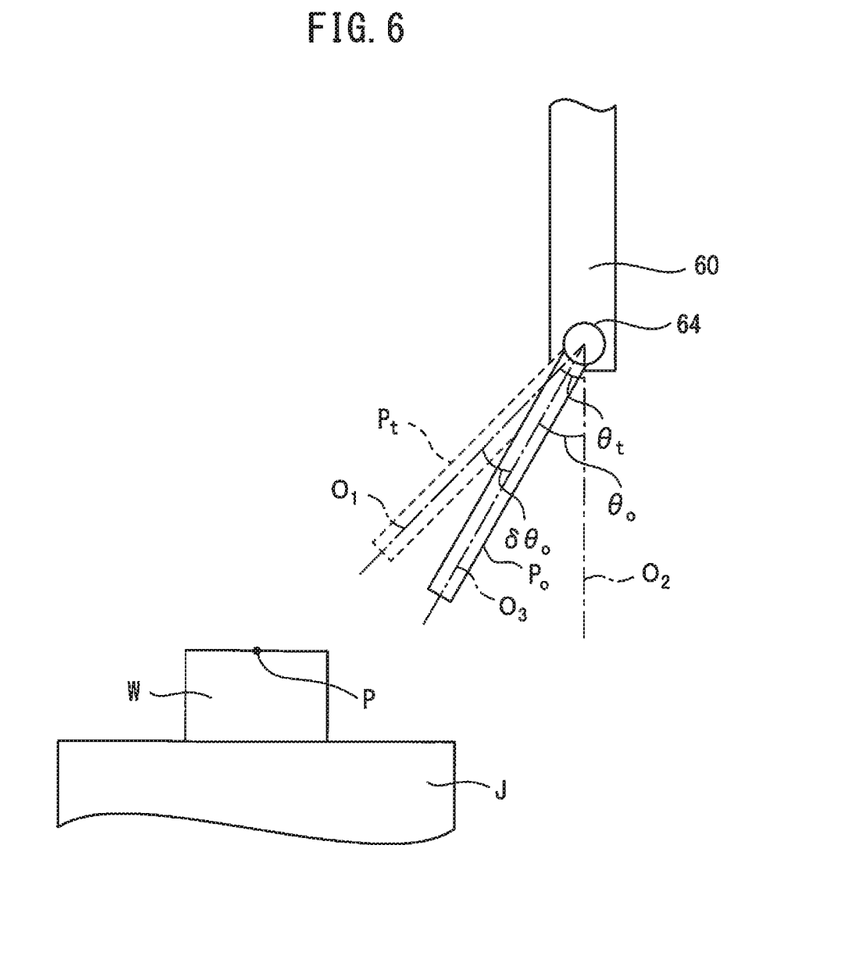
FIG. 6 is a view showing the position of the coolant nozzle at the end of step S11 in FIG. 4.

The axis $O_3$ of the coolant nozzle 62 arranged at the current position is inclined with respect to the virtual axis $O_2$ by an angle $\theta_0$. In this embodiment, the robot controller 14 calculates the angle $\theta_0$ based on the image data of the coolant nozzle 62 imaged at step S11 and on the coordinate and visual line data of the imaging part 18 at step S11. Then, the robot controller 14 calculates the difference $\delta\theta_0(=\theta_t-\theta_0)$ between the angle $\theta_t$ and the angle $\theta_0$.

At step S13, the robot controller 14 moves the coolant nozzle 62 by the robot 12. Specifically, the robot controller 14 sends commands to the servo motors built in the robot 12 so as to move the robot hand 28 to the position of the coolant nozzle 62 and grip the coolant nozzle 62.

For example, the robot controller 14 moves the robot hand 28 to the position of the coolant nozzle 62 based on the image data of the coolant nozzle 62 imaged at step S11 and on the coordinate and visual line data of the imaging part 18.

Then, the robot controller 14 operates the robot hand 28 so as to rotate the coolant nozzle 62 about the rotary shaft 64 in a direction where the difference $\delta\theta_0$ calculated at step S12 becomes smaller (in this embodiment, the clockwise direction as seen from front side of FIG. 6).

At step S14, the robot controller 14 sends a command to the imaging part 18 so as to image the coolant nozzle 62, similar as step S11.

At step S15, the robot controller 14 calculates the difference between the current position of the coolant nozzle 62 at this time and the target position, similar as step S12. Specifically, the robot controller 14 calculates the angle $\theta_1$ at this time, and then calculates the difference $\delta\theta_1(=\theta_t-\theta_1)$ between the angle $\theta_t$ and angle $\theta_1$ based on the image data of the coolant nozzle 62 imaged at step S14.

At step S16, the robot controller 14 determines whether the coolant nozzle 62 is arranged at the target position. Specifically, the robot controller 14 determines whether the difference $\delta\theta_1$ calculated at step S15 is zero.

When the difference $\delta\theta_1$ calculated at step S15 is zero, the robot controller 14 determines that the coolant nozzle 62 is arranged at the target position (i.e., determines "YES"), and proceeds to step S17.

On the other hand, when the difference $\delta\theta_1$ calculated at step S15 is not zero, the robot controller 14 determines that the coolant nozzle 62 is not arranged at the target position (i.e., determines "NO"), and returns to step S14.

Note that, at this step S16, the robot controller 14 may determine "YES" when the difference $\delta\theta_1$ calculated at step S15 is within the range between predetermined threshold values. For example, assuming that the clockwise direction seen from front side of FIG. 6 is a positive direction, the robot controller 14 may determine "YES" when satisfying the relationship: $-1°<\delta\theta_1<1°$.

At step S17, the robot controller 14 sends commands to the servo motors built in the robot 12 so as to stop the operation of the robot 12, and ends the flow shown in FIG. 3. By this step S3, it is possible to arrange the coolant nozzle 62 at the target position shown in FIG. 5.

Referring again to FIG. 3, at step S4, the robot controller 14 sets the workpiece W at the machine tool 50. Specifically, the robot controller 14 sends commands to the servo motors built in the robot 12 so as to grip the workpiece W arranged at a predetermined position, convey the workpiece W, and set it on the jig J. For example, the robot controller 14 sets the workpiece W on the jig J in accordance with a robot program stored in advance.

At step S5, the machine tool controller 58 drives the tool 54 to process the workpiece W. Specifically, the machine tool controller 58 sends a command to the spindle drive part 56 to downwardly move the spindle 52 toward the workpiece W so as to contact the spindle 52 with the workpiece W at the processing point P.

Then, the machine tool controller 58 sends a command to the coolant supply device so as to supply the coolant to the coolant nozzle 62. At this time, since the coolant nozzle 62 is suitably arranged at the target position by step S3, the discharged coolant A can impinge on the processing point P as shown in FIG. 5. Then, the machine tool controller 58 sends a command to the spindle drive part 56 so as to feed the spindle 52 downward while driving the tool 54 to rotate about the vertical axis. Due to this, the workpiece W is processed.

At step S6, the robot controller 14 removes the workpiece W from the machine tool 50. Specifically, the robot controller 14 sends commands to the servo motors built in the robot 12 so as to grip the processed workpiece W by the robot hand 28, and convey it to a predetermined location in accordance with the robot program.

At step S7, the robot controller 14 determines whether there is another command for process on workpiece received from the user. When determining that there is another command for process on workpiece (i.e., determining "YES"), the robot controller 14 proceeds to step S8. On the other hand, when determining that all of the commands for process on workpiece received from the user are executed (i.e., determining "NO"), the robot controller 14 ends the flow shown in FIG. 3.

At step S8, the robot controller 14 determines whether the type of the workpiece W to be processed is changed. Specifically, the robot controller 14 determines whether the type of the workpiece W is changed in above another command for process recognized at step S7.

When determining that the type of the workpiece W is changed (i.e., judging "YES"), the robot controller 14 returns to step S1. On the other hand, when determining that the type of the workpiece W is not changed (i.e., determining "NO"), the robot controller 14 returns to step S3.

As explained above, in this embodiment, the coolant nozzle 62 is arranged at the target position by means of the robot 12. According to this configuration, the coolant nozzle 62 can be precisely arranged at the target position, so it is possible to reliably feed the coolant to the processing point P.

Further, in this embodiment, the robot 12 performs the operations of adjusting the position of the coolant nozzle 62 (step S3) and changing the workpiece W (steps S4 and S6). According to this configuration, it is not necessary to additionally provide a drive device for moving the coolant nozzle 62. Therefore, it is possible to simplify the hardware configuration, so it is possible to reduce the costs.

Further, in this embodiment, the robot controller 14 calculates the difference $\delta\theta$ between the target position and current position of the coolant nozzle 62, and arranges the coolant nozzle 62 at the target position based on the difference. It is possible to automatically arrange the coolant nozzle 62 at the target position by programming such operation, which is advantageous for automation of the process on the workpiece W.

Further, in this embodiment, the robot controller 14 calculates the above-mentioned difference $\delta\theta$ based on the image obtained by the imaging part 18. According to this configuration, it is possible to calculate the difference $\delta\theta$ automatically and accurately.

Note that, in the above-mentioned embodiment, the robot controller 14 receives the type of the workpiece W designated by the user via the PC 38 installed outside of the robot control device 36.

However, the robot controller 14 may receive the type of the workpiece W from the host controller. In this case, the host controller is communicatively connected to the robot controller 14, and functions as the notification part 16.

Further, in the above-mentioned embodiment, the imaging part 18 is mounted at the robot arm 26. However, the imaging part 18 may be fixedly arranged at any position in the work cell. For example, when capturing the image shown in FIG. 6, the imaging part 18 may be fixedly arranged at rear side of the coolant nozzle 62.

Figure 7:
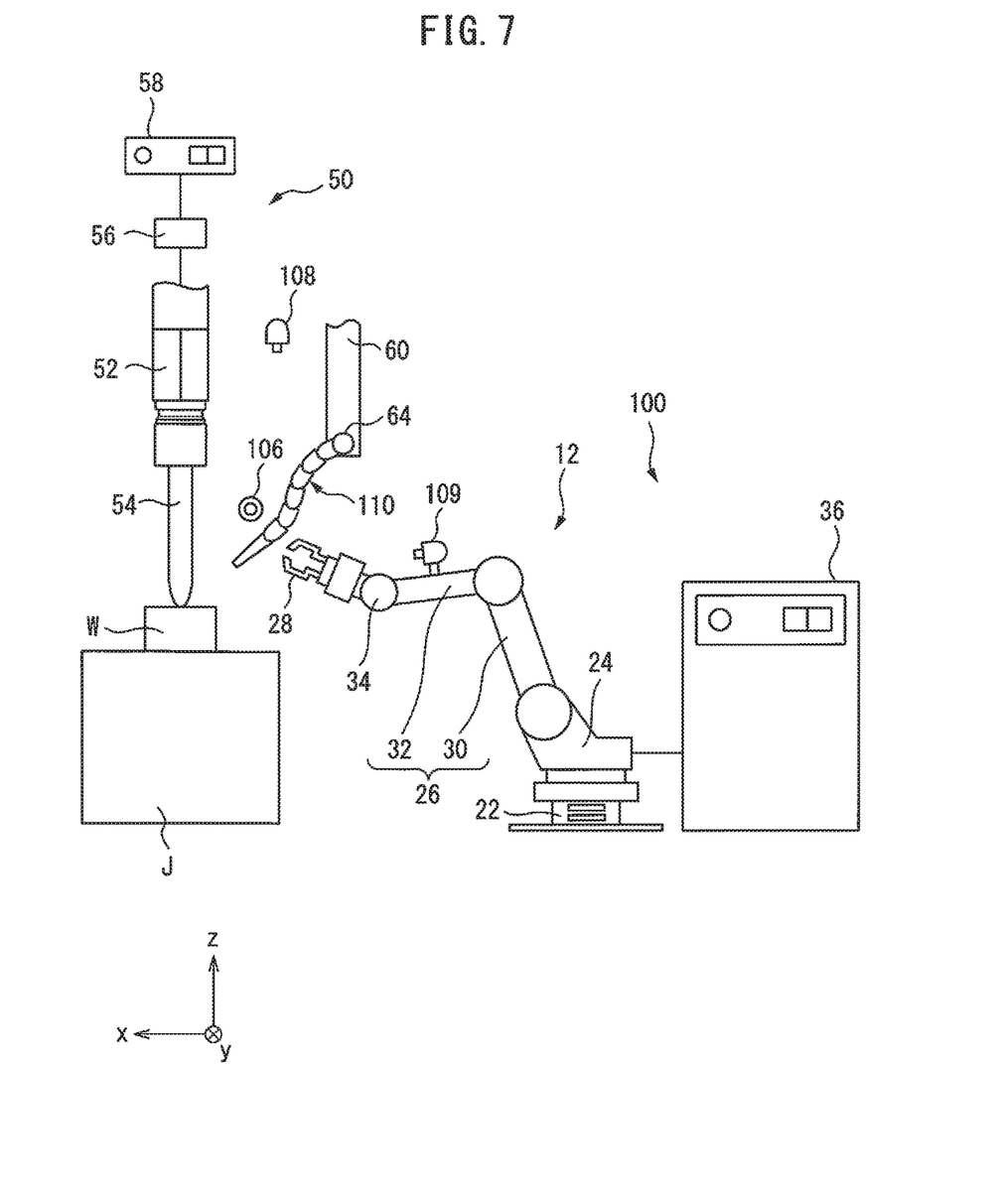
FIG. 7 is a schematic view of a machine tool and robot system according to another embodiment of the invention.
Figure 8:
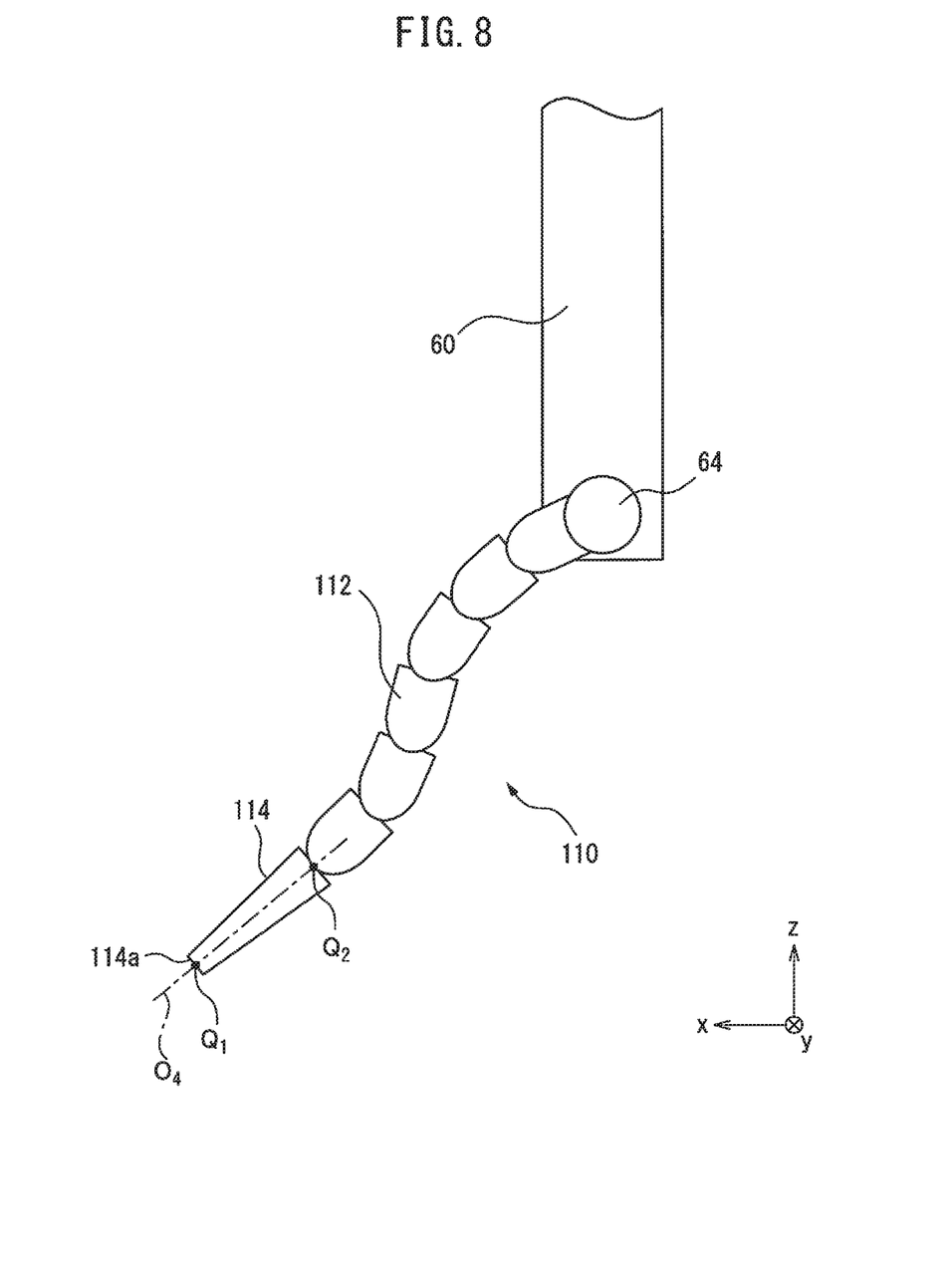
FIG. 8 is an enlarged view of the coolant nozzle shown in FIG. 7.

Next, referring to FIG. 7 to FIG. 9, a robot system 100 according to another embodiment of the invention will be explained. Note that, elements similar to the above-mentioned embodiment are assigned the same reference numerals, and detailed explanations thereof will be omitted.

The robot system 100 includes the robot 12, a robot controller 102, a notification part 104, a first imaging part 106, a second imaging part 108, a third imaging part 109, and the storage 20. In this embodiment, the robot controller 102, notification part 104, and storage 20 are built in the robot control device 36.

Each of the first imaging part 106, second imaging part 108, and third imaging part 109 includes an imaging element such as a CCD or CMOS sensor, similar as the above-mentioned imaging part 18.

The first imaging part 106 and second imaging part 108 are respectively fixed to two predetermined positions in the work cell, and image the coolant nozzle 110 explained below from different angles.

As an example, the first imaging part 106 is arranged at frontward of the coolant nozzle 110, while the second imaging part 108 is arranged upward of the coolant nozzle 110. On the other hand, the third imaging part 109 is fastened to the robot arm 26. The third imaging part 109 images the workpiece W set on the jig J.

The robot controller 102 is communicatively connected to the first imaging part 106, second imaging part 108, third imaging part 109, storage 20, and notification part 104, via the bus 40.

The coolant nozzle 110 is attached to the spindle head (not shown) via the attachment 60. Below, referring to FIG. 8, the configuration of the coolant nozzle 110 according to this embodiment will be explained.

The coolant nozzle 110 includes a shape memory type multi-articulated arm 112, and a discharge tube 114 provided at the distal end of the multi-articulated arm 112. The multi-articulated arm 112 can arrange the discharge tube 114 provided at the distal end thereof at arbitrary positions. The discharge tube 114 is a hollow tubular member extending along the axis $O_4$, and has a discharge port 114a at the distal end thereof.

Next, referring to FIG. 7 to FIG. 11, the operation of the robot system 100 according to this embodiment will be explained. FIG. 10 shows another example of the flow of processing the workpiece W. Note that, steps similar to the above-mentioned flow shown in FIG. 3 are assigned the same reference notations, and detailed explanations thereof will be omitted.

The operation flow shown in FIG. 10 starts when the robot controller 102 and machine tool controller 58 receive a command for process on the workpiece W from the user or host controller.

After starting the operation flow shown in FIG. 10, the robot controller 102 executes step S4 so as to operate the robot 12 to set the workpiece W on the jig J.

At step S21, the robot controller 102 sends a command to the third imaging part 109 so as to image the workpiece W set on the jig J at step S4. The third imaging part 109 sends image data of the workpiece W to the robot controller 102.

At step S22, the notification part 104 identifies the type of the workpiece W based on the image of the workpiece W imaged at step S21. As an example, the notification part 104 analyzes the captured image of the workpiece W, and searches for a characteristic point in the image.

The characteristic point is a point which shows an edge of an object or a location in a still image where a significant change in brightness occurs, and which has some sort of change in the still image. The storage 20 pre-stores data of characteristic points of various types of workpiece. Note that, the characteristic points of various workpieces W stored in the storage 20 are searched through based on the image captured by the second imaging part 108 under the same conditions as in step S21.

The notification part 104 compares the characteristic points in the image of the workpiece W imaged at step S21 with the characteristic points of various workpieces pre-stored in the storage 20, and identifies the type of the imaged workpiece W. Then, the notification part 104 notifies the identified type of the workpiece W to the robot controller 102.

At step S23, the robot controller 102 determines the target position of the coolant nozzle 110 with respect to the workpiece W, based on the type of the workpiece W acquired at step S22.

The target position corresponds to a position of the coolant nozzle 110 with respect to the workpiece W in which the coolant discharged from the discharge port 114a of the coolant nozzle 110 can impinge on the processing point P.

The injection path of the coolant discharged from the coolant nozzle 110 according to this embodiment depends on the flow rate of the discharged coolant (i.e., the supply pressure of the coolant by the coolant supply device), on the position of the discharge tube 114, and on the inclined angle of the axis $O_4$ of the discharge tube 114 with respect to the z-axis.

For example, the position of the discharge tube 114 and the inclined angle of the axis $O_4$ with respect to the z-axis can be evaluated by a coordinate of an intersection point $Q_1$ between the axis $O_4$ and the distal end face of the discharge tube 114, and a coordinate of an intersection point $Q_2$ between the axis $O_4$ and the proximal end face of the discharge tube 114.

Therefore, by experimentally obtaining in advance the relationship among the flow rate of the coolant, the coordinates of the intersection points $Q_1$ and $Q_2$, and the injection path of the coolant in these conditions, it is possible to feed the coolant from the coolant nozzle 110 to the desired position.

For example, if the types of workpiece W are set as shown in Table 1, the storage 20 pre-stores the coordinates of the intersection points $Q_{1-t}$ and $Q_{2-t}$, at which the coolant discharged from the discharge port 114a can impinge on the processing point P, in association with the types A to C of workpiece W. For example, the storage 20 pre-stores a data table shown below:

TABLE 3

| Type of workpiece | Type A | Type B | Type C |
|---|---|---|---|
| Coordinate of point $Q_{1-t}$ | $(x_{11}, y_{11}, z_{11})$ | $(x_{12}, y_{12}, z_{12})$ | $(x_{13}, y_{13}, z_{13})$ |
| Coordinate of point $Q_{2-t}$ | $(x_{21}, y_{21}, z_{21})$ | $(x_{22}, y_{22}, z_{22})$ | $(x_{23}, y_{23}, z_{23})$ |

The robot controller 102 reads out from the storage 20 the coordinates of the intersection points $Q_{1-t}$ and $Q_{2-t}$ corresponding to the type of the workpiece W identified at step S22, and determines the position of the discharge tube 11 corresponding to the read-out coordinates of the intersection points $Q_{1-t}$ and $Q_{2-t}$ as the target position of the coolant nozzle 110.

At step S24, the robot controller 102 arranges the coolant nozzle 110 at the target position determined at step S23. This step S24 will be explained with reference to FIG. 11. Note that, steps similar to FIG. 4 are assigned the same reference notations, and detailed explanations thereof will be omitted.

Figure 11:
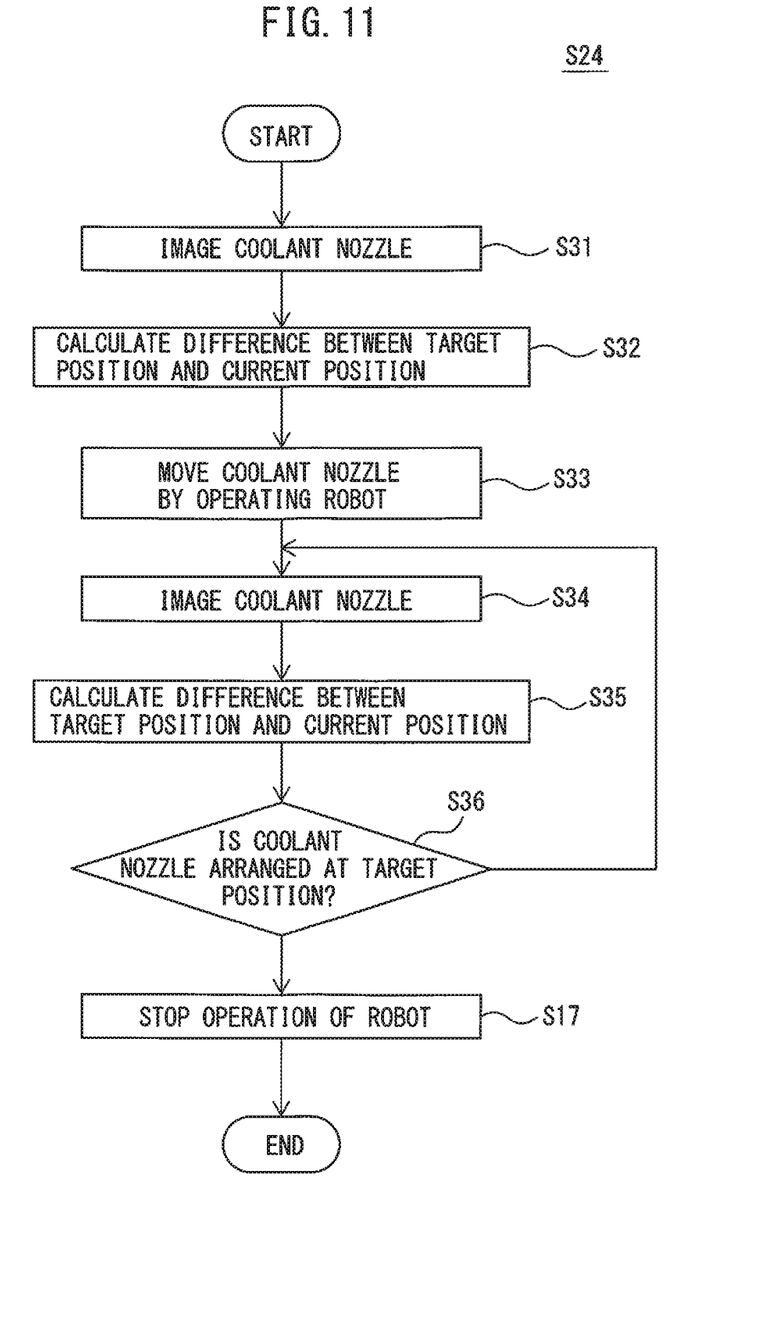
FIG. 11 is a flow chart of step S24 in FIG. 10.

After starting step S24, at step S31, the robot controller 102 sends commands to the first imaging part 106 and the second imaging part 108 so as to image the coolant nozzle 110.

Specifically, the first imaging part 106 images the coolant nozzle 110 from frontward of it, and sends the image data to the robot controller 102. Further, the second imaging part 108 images the coolant nozzle 110 from upward of it, and sends the image data to the robot controller 102.

At step S32, the robot controller 102 calculates the difference between the target position determined at step S23 and the current position of the coolant nozzle 110.

Specifically, the robot controller 102 calculates the coordinates of the intersection points $Q_{1-0}$ and $Q_{2-0}$ of the discharge tube 114 at the current time, based on the image data of the coolant nozzle 110 imaged from two different angles at step S31, on the coordinates of the first imaging part 106 and second imaging part 108, and on the visual line data of the first imaging part 106 and second imaging part 108.

Then, the robot controller 102 calculates the difference $\delta Q_{1-0}$ between the coordinate of the intersection point $Q_{1-t}$ corresponding to the target position and the coordinate of $Q_{1-0}$ corresponding to the current position, and the difference $\delta Q_{2-0}$ between the coordinate of the intersection point $Q_{2-t}$ corresponding to the target position and the coordinate of $Q_{2-0}$ corresponding to the current position.

At step S33, the robot controller 102 moves the coolant nozzle 110 by the robot 12. Specifically, the robot controller 102 sends commands to the servo motors built in the robot 12 so as to move the robot hand 28 to the position of the discharge tube 114 and grip the discharge tube 114.

Then, the robot controller 102 operates the robot 12 (e.g. the robot hand 28) so as to move the discharge tube 114 in a direction in which the differences $\delta Q_{1-0}$ and $\delta Q_{2-0}$ calculated at step S32 became smaller.

At step S34, the robot controller 102 sends commands to the first imaging part 106 and second imaging part 108 so as to image the coolant nozzle 110, similar as step S31.

At step S35, the robot controller 102 calculates the difference between the current position of the coolant nozzle 110 at this time and the target position, similar as step S32. Specifically, the robot controller 102 calculates the coordinates of the intersection points $Q_{1-1}$ and $Q_{2-1}$ of the discharge tube 114 at this time, based on the image data of the coolant nozzle 110 imaged at step S34.

Then, the robot controller 102 calculates the difference $\delta Q_{1-1}$ between the coordinate of the intersection point $Q_{1-t}$ corresponding to the target position and the coordinate of $Q_{1-1}$ corresponding to the current position, and the difference $\delta Q_{2-1}$ between the coordinate of the intersection point $Q_{2-t}$ corresponding to the target position and the coordinate of $Q_{2-1}$ corresponding to the current position.

At step S36, the robot controller 102 determines whether the coolant nozzle 110 is arranged at the target position. Specifically, the robot controller 102 determines whether the differences $\delta Q_{1-1}$ and $Q_{2-1}$ calculated at step S35 are zero (or within a range between predetermined threshold values).

When the differences $\delta Q_{1-1}$ and $Q_{2-1}$ calculated at step S35 are zero (or within range of predetermined threshold value), the robot controller 102 determines that the coolant nozzle 110 is arranged at the target position (i.e., determines "YES"), and proceeds to step S17.

On the other hand, when the differences $\delta Q_{1-1}$ and $Q_{2-1}$ calculated at step S35 are not zero (or within the range of the predetermined threshold values), the robot controller 102 determines that the coolant nozzle 110 is not arranged at the target position (i.e., determines "NO"), and returns to step S34. After the end of step S24, the robot controller 102 sequentially executes steps S5 to S8, similar as the flow shown in FIG. 3.

As explained above, according to this embodiment, since the coolant nozzle 110 has a shape memory type multi-articulated arm 112, the discharge tube 114 can be arranged at an arbitrary position. Therefore, the coolant can be fed to an arbitrary position, so a broader range of workpieces W can be processed.

Further, in this embodiment, the coolant nozzle 110 is arranged at the target position by means of the robot 12. According to this configuration, the coolant nozzle 110 can be arranged at the target position with a high precision, so it is possible to reliably feed the coolant to the processing point P.

Further, in this embodiment, the robot 12 performs the operations of adjusting the position of the coolant nozzle 110 (step S24) and changing workpiece W (steps S4 and S6). According to this configuration, it is not necessary to additionally provide a drive device for moving the coolant nozzle 110. Therefore, it is possible to simplify the configuration of the apparatus, so the cost can be lowered.

Further, in this embodiment, the robot controller 102 identifies the type of the workpiece W based on the image of the workpiece W imaged by the third imaging part 109 (step S22). According to this configuration, the robot controller 102 can automatically identify the type of the workpiece W without the user's designation, which is advantageous for automation of the process on the workpiece W.

Note that, in the above-mentioned embodiments, single coolant nozzle 62 or 110 is provided. However, a plurality of coolant nozzles may be provided.

In this case, the robot hand may be configured so as to simultaneously grip the plurality of coolant nozzles. In this case, the robot controller can arrange the coolant nozzles at target positions thereof by an operation flow similar to FIG. 3 or FIG. 10. Alternatively, the robot controller may perform the operation flow shown in FIG. 3 or FIG. 10 for each of the plurality of coolant nozzles, and arrange the plurality of coolant nozzles at the target positions thereof, one by one.

Further, in the above-mentioned embodiments, the types of workpiece are defined as shown in Table 1. However, the type of workpiece can be defined in accordance with various parameters, such as the material or hardness of the workpiece W, the coordinate of the processing point P, etc.

Further, in the above-mentioned embodiments, the processing point P is set to the contact point between the tool 54 and workpiece W at the start of processing. However, the processing point P may be set to the front end point of the tool 54 after a predetermined time has elapsed from the start of processing.

Further, in the above-mentioned embodiments, the machine tool 50 processes the workpiece W by the tool 54 which moves in the vertical direction. However, the machine tool may be e.g. a milling machine which machines the outer circumference of a workpiece.

Figure 9:
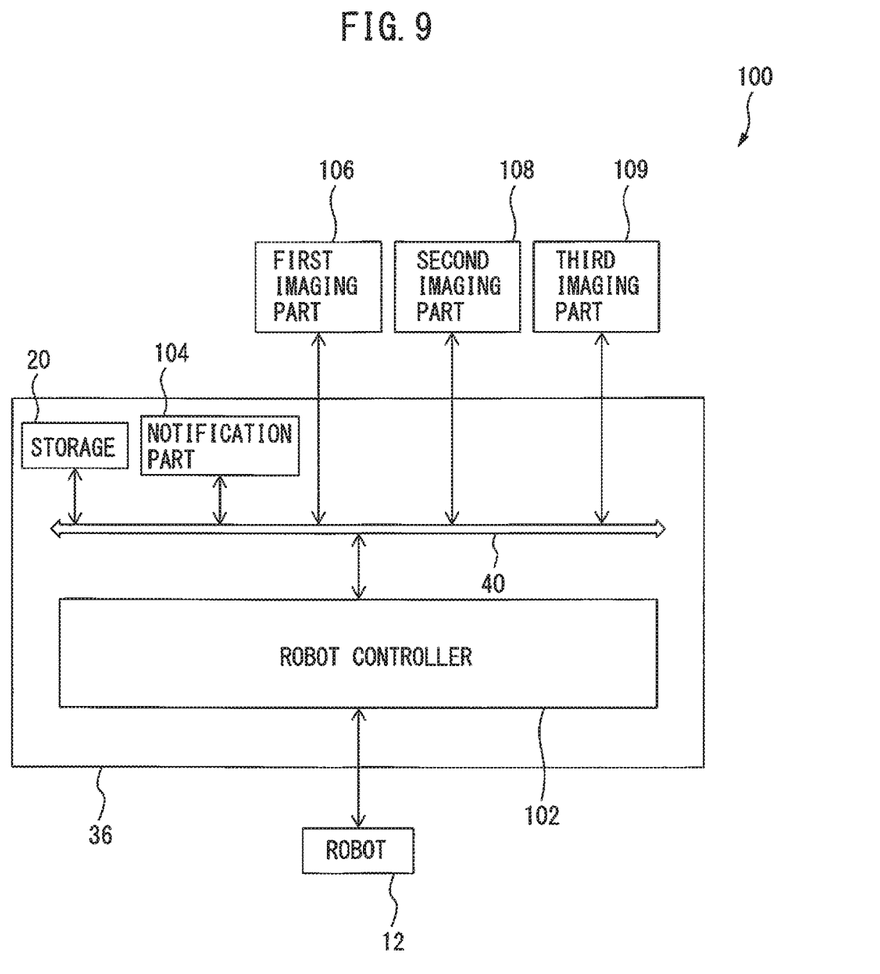
FIG. 9 is a block diagram of the robot system shown in FIG. 7.
Figure 10:
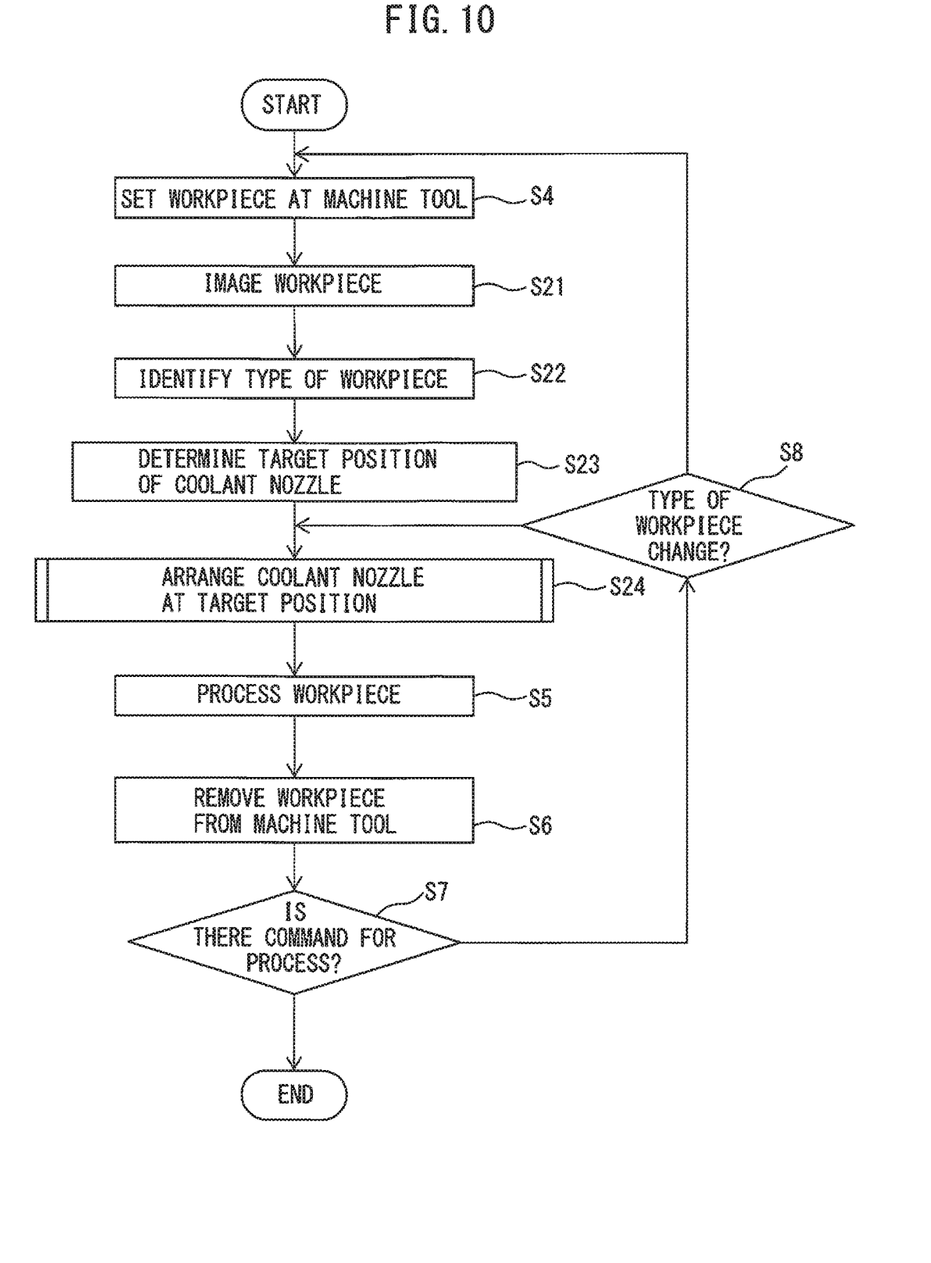
FIG. 10 is a flow chart showing a flow of processing a workpiece, according to another embodiment of the invention.

Further, in the embodiment shown in FIG. 9, the robot controller 102 and the notification part 104 perform the separate functions. However, the notification part 104 may be incorporated in the robot controller 102, wherein the robot controller 102 may perform the function of the notification part 104.

Further, in the above-mentioned embodiments, the storage 20 is built in the robot control device 36. However, the storage 20 may be provided as an external device separated from the robot control device 36.

Figure 12:
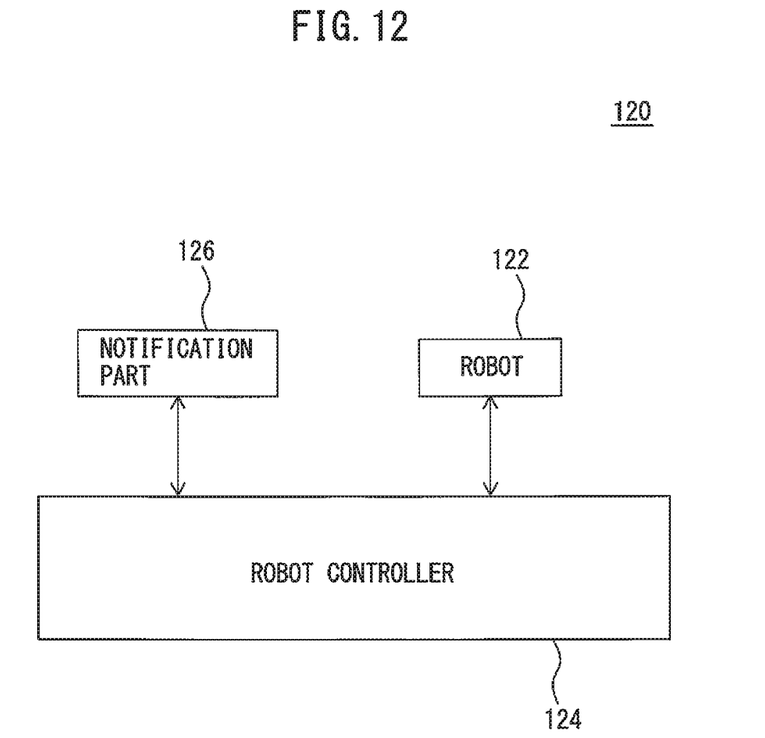
FIG. 12 is a block diagram of a robot system according to still another embodiment.

Further, in the above-mentioned embodiments, the robot system 10, 100 includes the imaging part 18, 106, 108, 109 and storage 20. However, the imaging part and storage may be excluded from the robot system. Such a robot system 120 is shown in FIG. 12.

This robot system 120 includes a robot 122, a robot controller 124 which controls the robot 122, and a notification part 126 which notifies the robot controller 124 of a type of a workpiece to be processed by the machine tool.

In this embodiment, the robot controller 124 acquires from the notification part 126 information of a processing point P included in a processing program, as information of the type of the workpiece.

Then, the robot controller 124 can determine the angle θt of the coolant nozzle 62 shown in FIG. 1 based on the processing point P, and move the coolant nozzle 62 by the robot 122 so as to arrange the coolant nozzle 62 at the angle θt, for example.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, it should be noted that the operations, routines, steps, stages, and other processing in the system and method in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", "then", etc. for convenience, this does not mean the execution in this order is essential.

The invention claimed is:

1. A robot system for adjusting a position of a coolant nozzle provided at a machine tool, the robot system comprising:
   a robot;
   a robot controller configured to control an operation of the robot; and
   a notification part configured to notify the robot controller of a type of a workpiece to be processed by the machine tool, wherein
   the robot controller is configured to:
      determine a target position of the coolant nozzle with respect to the workpiece when processing, based on the type of the workpiece acquired from the notification part; and
      control the robot to move the coolant nozzle to arrange the coolant nozzle at the target position, and
   the robot is configured to perform both adjusting the position of the coolant nozzle and changing the workpiece.

2. The robot system according to claim 1, wherein the robot controller is further configured to:
   calculate a difference between the target position and a current position of the coolant nozzle; and
   control the robot to move the coolant nozzle so that the calculated difference becomes smaller.

3. The robot system according to claim 2, further comprising:
   an imaging part, wherein
   the robot controller is further configured to
      identify the current position of the coolant nozzle based on an image of the coolant nozzle imaged by the imaging part, and
      calculate the difference.

4. The robot system according to claim 1, further comprising:
   an imaging part, wherein
   the notification part is configured to
      identify the type of the workpiece based on an image of the workpiece imaged by the imaging part, and
      notify the robot controller of the identified type of the workpiece.

5. The robot system according to claim 3, wherein the imaging part is mounted at a robot arm of the robot.

6. The robot system according to claim 1, further comprising:
   a storage which pre-stores the target position in association with the type of the workpiece, wherein
   the robot controller is further configured to read out from the storage the target position corresponding to the type of the workpiece acquired from the notification part.

7. The robot system according to claim 1, wherein the notification part is built in an external device or a host controller connected to the robot controller.

8. A robot control method of adjusting a position of a coolant nozzle provided at a machine tool by a robot, the robot control method comprising:
   acquiring a type of a workpiece to be processed by the machine tool;

determining a target position of the coolant nozzle with respect to the workpiece set at the machine tool, based on the acquired type of the workpiece;

moving the coolant nozzle by the robot to arrange the coolant nozzle at the target position; and changing the workpiece by the robot.

9. A robot system for adjusting a position of a coolant nozzle provided at a machine tool, the robot system comprising:

a robot;

a robot controller configured to control an operation of the robot; and a notification part configured to notify the robot controller of a type of workpiece which is predetermined in accordance with a feature of a workpiece to be processed by the machine tool, wherein the robot controller is configured to:

based on the type of workpiece acquired from the notification part, determine a target position of the coolant nozzle with respect to the workpiece, wherein a coolant from the coolant nozzle located at the target position is dischargeable on a processing point where the machine tool processes the workpiece; and control the robot to move the coolant nozzle to arrange the coolant nozzle at the target position.

10. A robot control method of adjusting a position of a coolant nozzle provided at a machine tool by a robot, the robot control method comprising:

acquiring a type of workpiece which is predetermined in accordance with a feature of a workpiece to be processed by the machine tool;

based on the acquired type of workpiece, determining a target position of the coolant nozzle with respect to the workpiece, wherein a coolant from the coolant nozzle located at the target position is dischargeable on a processing point where the machine tool processes the workpiece; and moving the coolant nozzle by the robot to arrange the coolant nozzle at the target position.

* * * * *